Aug. 8, 1961 H. G. McDONELL ET AL 2,995,410
CALIBRATED BAR GRAPH RECORDING SYSTEM
Filed Dec. 26, 1957 2 Sheets-Sheet 1

INVENTORS
HORACE G. McDONELL
EMMETT S. WATSON
BY
John L. McLaren
ATTORNEY

CALIBRATED BAR GRAPH RECORDING SYSTEM

Filed Dec. 26, 1957 2 Sheets-Sheet 2

INVENTORS
HORACE G. McDONELL
EMMETT S. WATSON

ATTORNEY

United States Patent Office 2,995,410

Patented Aug. 8, 1961

2,995,410

CALIBRATED BAR GRAPH RECORDING SYSTEM

Horace G. McDonell and Emmett S. Watson, Ridgefield, Conn., assignors to The Perkin-Elmer Corporation, Norwalk, Conn., a corporation of New York Filed Dec. 26, 1957, Ser. No. 705,263

5 Claims. (Cl. 346—23)

The present invention pertains to a recording system for producing recorded data in the form of a bar graph. Certain kinds of cyclically repetitive time displaced signals contain information which is primarily reflected in the amplitude of the signals. Where the time interval between signals is not of particularly important significance, the present invention affords a means of displaying amplitude information of a plurality of time displaced signals by discarding abscissa information and recording only that contained in the ordinate. This results in graphically recorded data displayed as a number of uniformly spaced straight-line ordinate displacements.

The present invention is particularly useful where the information of greatest interest is in trends of one or more of the cyclically repetitive signals. Moreover, in accordance with the teaching of the present invention, the input signals of the recorder system may be individually calibrated so as to afford greater accuracy and more meaningful information as to trends of data change, direct-reading percentages, etc.

One important application of the present invention is that which involves the recording of data derived from the analysis of a process stream at regular intervals by vapor fractometry means. Customarily, vapor fractometers provide information which consists of a number of signals separated by intervals of time. The recorded data of a conventional fractogram usually represents time along the abscissa and peak height of separated components of the sample along the ordinate. Each peak is indicative of the sample undergoing analysis. Thus, each major component of a sample will be represented by a peak.

Usually, the peaks are more sharply defined in the components of least retention time. The peaks of later components having longer retention times are usually considerably more flattened and the component indications spread over a longer time period. In vapor fractograms, the significant information as to quantity is the area under the curve of each component indication. As a consequence, peak height of itself is not wholly significant as to the percentage of a component contained in a particular sample.

The present invention makes it possible to so calibrate component signals that they may be read directly in percentage concentration. By such calibration, peak height information may be adjusted in accordance with the teaching of the present invention to read directly in terms of area under each component peak. The recorder system of the present invention therefore affords directly readable percent concentration of each component contained in samples analyzed by vapor fractometry.

The present invention makes it possible to run a standard sample with known percentages of concentration and calibrate the recording system in accordance with the signals derived from such a sample so that subsequent samples from a process stream, for instance, which are analyzed by a vapor fractometer may be compared to the calibrated signals of the standard sample as a criteria of the desired operation of a particular process.

These and other features and advantages of the present invention will appear more fully from the explanation and disclosure of a typical embodiment which follows hereafter.

In recent years, vapor fractometry principles have been extensively employed in analysis and are particularly useful in the petro-chemical industries where the analysis of hydrocarbons is a most important problem. Vapor fractometry may be emplained as the analysis and identification of the components of sample mixtures of volatile liquids and gases by separation of the sample into its several constituents through exploitation of a physical phenomena by which the several constituents of the sample are retained for different times in a separation column.

Recently, the partition method of separating has been perfected and a number of highly successful instruments are extensively used in industry and in the laboratory to perform this kind of analysis and separations. Separations through the use of a vapor fractometer may be made by injecting individual samples into the column of the instrument or, as has recently been developed, automatic means for injecting a sample from a process stream at regular intervals may be employed.

The invention of the present recording system is particularly designed to be employed with a process type instrument where samples are taken from a process stream at regular intervals, each sample being analyzed to discern differences in concentration of each of the constituents which make up the sample. Thus, by this means, a continuous analysis of the performance of the process stream is had. The information thus derived may be used to make appropriate changes and adjustments in the process apparatus, either by an operator or automatically performed by appropriate servomechanism means.

Figure 1:
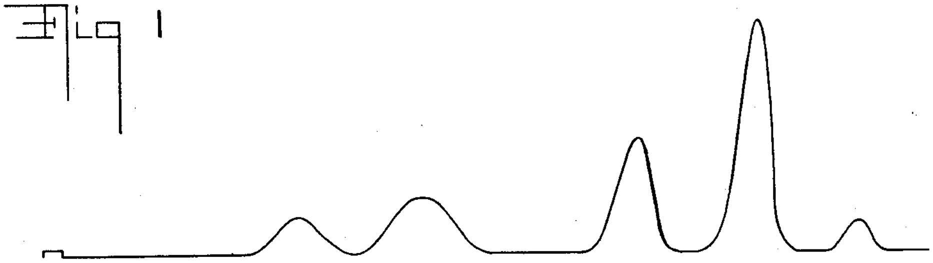
FIG. 1 is an illustration of a typical fractogram produced by a vapor fractometer type of instrument.

FIG. 1 is a fractogram of a typical vapor fractometer analysis wherein a sample is inserted into a vapor fractometer and separated into its components provided in the signals as indicated. Usually, the signals are indicative of the change of thermal conductivity of the eluent emerging from the column, relative to the carrier gas entering the column. The partition method of gas chromatography provides the separated peak type of information, whereas the displacement method, by contrast, provides a stepped output where the signal does not return to the baseline between component indications. In the illustration of FIG. 1, the abscissa represents a uniform passage of time from right to left and the samples represented by the separate peaks are propane, isobutane, butane, isobutylene and butene, transbutene, and cis-butene.

In a process vapor fractometer which analyzes samples from a process stream at regular intervals, the retention times of the constituents of the sample are not relatively important once the components of the sample have been identified. The retention times do not change from one analysis to the next and the most important information to be discerned in repetitive analyses of a process stream is change in peak height of the same sample component between successive sample analyses or over a series of successive analyses. The information which is desired is therefore primarily contained in the ordinate of the recorded data and the bar graph type of recording has been conceived to conveniently provide such information. In accordance with this concept, all recorded data is separated by unit increments of abscissa displacement without regard to the actual time of retention of the constituents of each sample.

Figure 2:
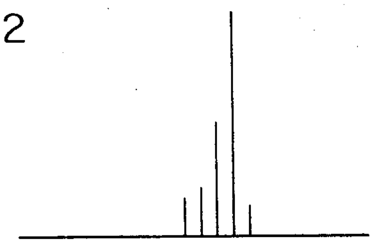
FIG. 2 is an illustration of a bar graph recording of the type produced by the use of the present invention.

FIG. 2 illustrates the bar graph recording derived from a vapor fractogram such as that illustrated in FIG. 1. The ordinate peaks of the bar graph may have the same height as the corresponding peaks of the conventional fractogram. However, in accordance with the teaching of the present invention, the full scale peak height of each particular consituent of a sample may be calibrated and adjusted so that the information contained in subsequent sample data may be read directly in terms of percentages or other convenient measurement as will appear more fully from an understanding of the operation of a typical embodiment of the present invention, such as that illustrated by the schematic drawing of FIG. 3.

The present invention is particularly useful in connection with recording fractogram information and, for purposes of convenience, will therefore be described and explained as used in connection with a process fractometer, although the invention is not confined to such use.

Figure 3:
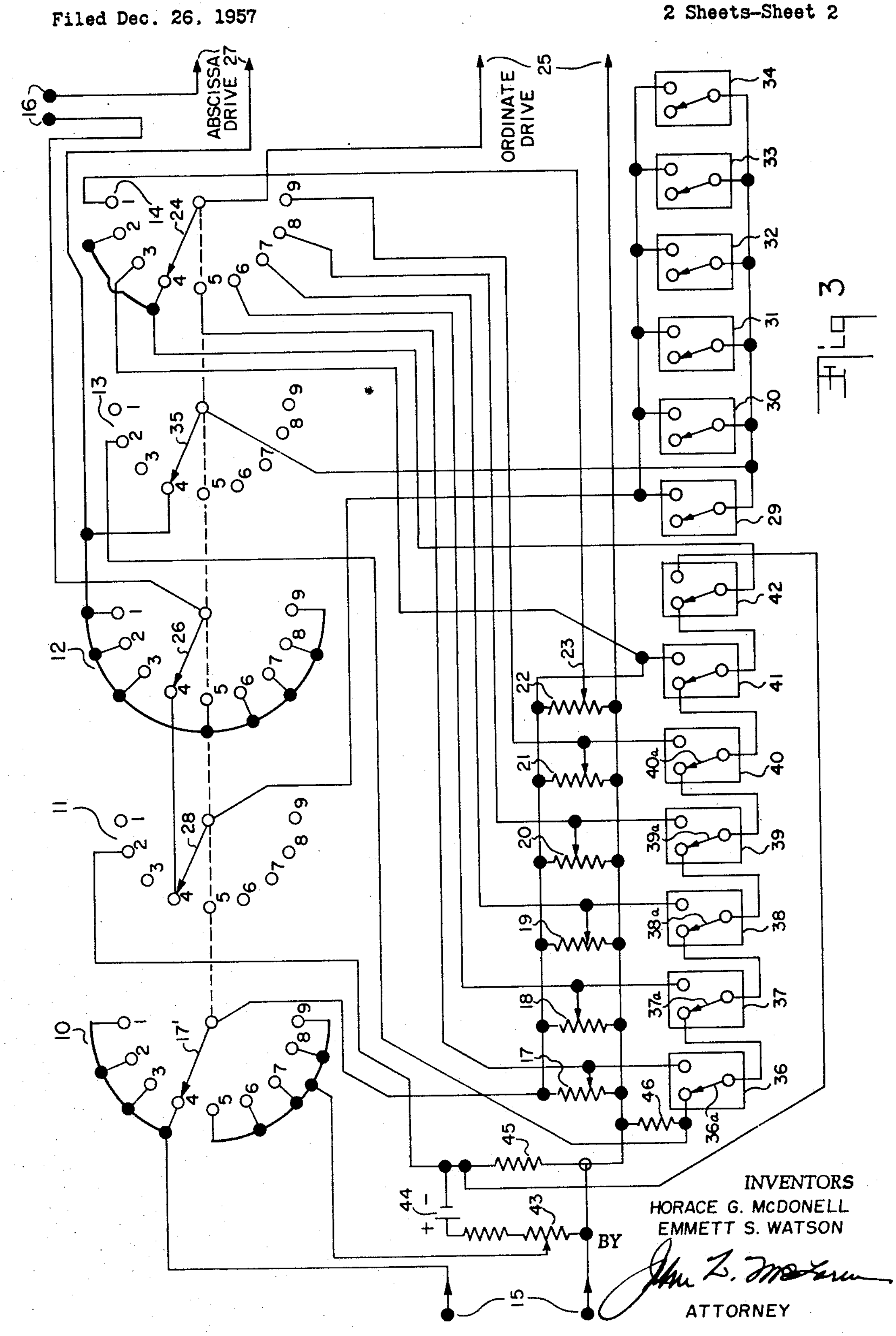
FIG. 3 is a schematic illustration of a typical embodiment of the recorder system of the present invention.

As illustrated in FIG. 3, the present invention employs a multiple bank switching means as indicated at 10, 11, 12, 13, and 14. The multiple bank switching means illustrated in FIG. 3 has four positions for different modes of operation of the recorder system and has five additional positions affording the calibration of five different cyclically repetitive time displaced signals which form the input to the system. These positions are indicated by the numerals 1 through 9 on the five banks 10, 11, 12, 13, and 14 of the multiple switch.

The input to the recorder system is impressed across input terminals 15 and is fed to contacts 1, 2, 3, and 4 of the first bank 10 on the multiple switching means. A source of power 16 is provided to energize the abscissa drive means of the recorder (not shown). The output signals of the recording system of the present invention appearing at terminals 25 and 27 are impressed upon the ordinate drive and the abscissa drive means, respectively. Assuming that the switch means is in position one, it may be seen that the input signal appearing at terminals 15 is fed to the first switch bank, picked up by the wiper 17′ from contact 1, and appears across the parallel-connected attenuators 17, 18, 19, 20, 21, and 22. An adjustable tap 23 connects a selected portion of the signal to the contact at position one of the fourth bank 14 of the multiple switch. With the wiper 24 in position one, the signal appears at terminals 25 and becomes the output for the recorder ordinate drive.

The abscissa drive output signal is provided by a source of energy 16 which is fed to the contact at position one of the third bank 12 of the multiple switching means, connected through tap 26, and appears at the output terminals 27 for the recorder abscissa drive.

In the normal fractogram mode of operation with the switch means in position one, the abscissa drive means is energized at a uniform rate with respect to time and the ordinate drive means is energized in accordance with the plurality of time displaced signals. The type of output provided by this mode of operation is graphically illustrated in FIG. 1.

When the conventional fractogram has been run, the various constituents of the sample may be identified by their retention time and, once having been so identified, may thereafter be recognized by the order in which they appear at terminals 15 as the input signals to the recorder system. The bar graph mode of operation of the present system is achieved with the multiple five-bank switch means in position four. With the switch means in position four, the input to the system appearing at terminals 15 is impressed upon the contact 4 of the first bank 10 of the multiple switch means and is picked up by tap 17′ and impressed across the parallel connected variable tap attenuators 17, 18, 19, 20, 21, and 22. These attenuators are connected to an associated series of switches arranged so that the signal appearing across each of the attenuators 17 through 21 may be made to appear at the output terminals 25 to actuate the ordinate drive means and recorder.

Assuming that the recorder system has been operated in the conventional fractogram mode as illustrated in FIG. 1, a definite retention time has been established for each component of the sample mixture and it is known that a sample of the same kind injected into a process vapor fractometer will produce separated components eluting from the column after established periods of time. Accordingly, using the injection of a sample into a vapor fractometer column as an initial point of operation, timing means having a uniform advance with respect to time may be employed with mechanical cam, electromechanical gating means, or electronic switch means selectively adjusted to actuate each of the switches 36 through 40 at selected time intervals when different components of the sample are eluted from the vapor fractometer column. An operatively synchronized cam or other appropriate means actuates switch 36, and the contact arm **36*a* is moved to its right-hand position where it picks up the signal tapped from attenuator 17. From there, the signal is fed through the remaining switches 37 through 42 to position four of the fifth bank 14 of the multiple switch means. Tap 24 of the fifth bank 14 picks up the signal from contact 4 and it thus becomes the output appearing at the ordinate drive terminals 25.**

After a properly predetermined and selected period of time, the cam or other appropriately adjusted switch actuating means moves the contact arm **37*a* of switch 37 to its right-hand position, disconnecting switch 37 from switch 36. In its right-hand position, switch 37 is connected to attenuator 18 and picks up that portion of the signal tapped by attenuator 18. Similarly, the contact arms of switches 38, 39 and 40 are each actuated to its right-hand position in timed sequence, coincident with the time displaced elution of a particular component of the sample being analyzed. The cam or other switch actuating means also performs the function of actuating switches 29 through 32 one at a time following each actuation of the switches 36 through 40. The switch actuating means is so designed as to actuate switches 29 through 32 for a fixed and uniform length of time. Thus, the power source 16 is connected through contact arm 26 of the third bank 12 of the multiple switch means to its contact 4 and through an electrical connection to contact 4 of the second bank 11. The contact arm 28 is connected to the energy source through contact 4 and impresses it for a unit length of time upon switches 29 through 32** which are parallel connected.

An abscissa drive signal is provided through contact arm 35 and contact 4 of the fourth bank 14 of the multiple switch means and appears at the abscissa drive output terminals 27. Since each of the switches 29 through 32 are actuated for a like period of time, the chart of the recorder is advanced a unit increment regardless of the actual time elapsed between components of the sample being eluted from the vapor fractometer.

This type of recording is known as "bar graph" and is shown in FIG. 2 of the drawings. It will be noted that FIG. 2 displays six components of the sample, each of which corresponds to a component of the sample as displayed in the normal fractogram of FIG. 1. As shown in FIG. 2, the ordinate amplitudes of corresponding components are the same as in FIG. 1 as also is the order of the components but, as has been previously explained, the record made possible by the use of the present invention is such that each of the ordinates displayed is separated by a unit increment, each of the components having been previously established and identified by a normal fractogram as shown in FIG. 1.

Another most important feature of the present invention is the arrangement of the recording system by which each component signal may be calibrated to provide a more accurate and convenient direct reading measure of concentration of each component as explained by the vapor phase or other phenomena. For instance, it may be most important to discern the change or trend of a particular component of a sample which is repetitively analyzed by a vapor fractometer or other means providing a signal of similar characteristics. Each of the attenuators 17 through 21 may be set or adjusted so that the percentage concentration of a sample can be read directly from the bar graph fractogram. Typically, a particular component may be only five percent of the sample, quantitatively. Changes in such a relatively small concentration are not too apparent when recorded at five percent of full scale in the usual recording system. If five percent is represented by five scalar divisions, a one-tenth change in the five percent concentration will be represented by a nearly indiscernible one half of one scalar division. However, the recording system of the present invention makes it possible to adjust the amplitude of the signal produced by any particular component of a sample may be adjusted to an appropriate full scale value so that any change from the desired full scale value is readily evident from the recording produced. The manner in which this is accomplished is as follows:

In order to calibrate the first sample component, the multiple switch means is turned to position five and the signal appearing across a potentiometer 43 is picked up by the contact arm 17'. The potential across potentiometer 43 is furnished by a suitable electrical source such as battery 44. The tap of potentiometer 43 is adjusted to match the amplitude of the first component as recorded in the normal fractogram such as FIG. 1. The tap of attenuator 17 is then adjusted to provide a full scale reading of appropriate and convenient amplitude relative to the concentration of that particular component in the sample, the amplitude of signals produced by other components, and the scale unit increments of the recorder with which the system is used. The adjusted signal tapped by attenuator 17 appears at contact 5 of the fifth bank 15 of the multiple switch means. Contact arm 24 picks up the adjusted attenuator signal and that signal provides the ordinate output at terminals 25.

In a similar manner, the multiple switch means is moved to position 6 and the amplitude of the next component signal, as ascertained from the normal fractogram of FIG. 1, may be matched by the adjustment of potentiometer 43 and thereafter attenuator 18 is adjusted to provide an appropriate full scale amplitude for the second component. The attenuators 19, 20, and 21 are similarly adjusted with the multiple switch in positions 7, 8, and 9 respectively. The latter three calibrations pertain to the third, fourth, and fifth sample components.

Thus, it may be seen that the system of the present invention provides a means by which the originally ascertained amplitude of a standard sample may be matched by an adjustable artificial signal by observing the recorded signal. Then, by adjusting the attenuator associated with that component of the sample, a full scale reading may be had which, for instance, in the case of vapor fractometry, may be proportionate to the area under the curve produced by the peak indication of a particular component of a sample. In this way, the present invention makes it possible, not only to adjust full scale readings to provide a more convenient and accurate indication of the amplitude of each component of a sample, but by appropriate adjustment provides the means by which the percentage concentration, which is a function of the integrated area under the curve of each sample component peak, may be ascertained directly from the amplitude of the recorded ordinate signal.

The attenuator 22 and its associated adjustable tap means 23 provides a sensitivity adjustment for the recorder system when it is in the normal fractogram mode of operation as produced by setting the multiple switch means in its position one.

Figure 4:
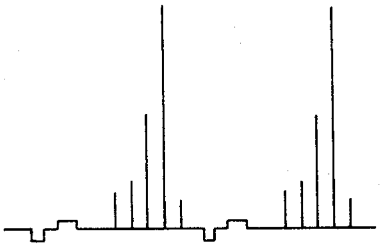
FIG. 4 is an illustration of repetitive bar graph signals made in accordance with the present invention.

Switch 41 is actuated after the several components of the samples have produced and recorded their signals. With switch 41 in its right-hand position, the potential appearing across attenuator 22 is made to actuate the ordinate drive and provides a reference or baseline signal which may be compared to the baseline recorded between ordinate excursions of the recorder. Such a baseline reference signal is shown as recorded in FIG. 4 where it is illustrated as a stepped portion slightly above the baseline level of the recorded bar graph.

Subsequent to the actuation of the switch 41, switch 42 is moved to its right-hand position at which time a negative signal derived from the potential across a resistor 45 connected in circuit with battery 44 is impressed upon the ordinate drive means through output terminals 25.

Both these latter two signals are connected in circuit as described coincidently with the actuation of the switches 33 and 34 so that at the same time the ordinate drive is actuated and the abscissa drive is also caused to be advanced by a unit increment. The result is a graphic record such as that illustrated in FIG. 4 where it may be seen that after the last component signal a small step signal is recorded in a positive direction indicating a baseline reference, and thereafter a negative signal is recorded indicating the end of the analysis cycle. The negative signal may also be used to actuate a sample injection means automatically so as to recycle the operation of the co-ordinated analysis instrument and recorder system.

The remaining two positions of the multiple switch means provide additional modes of operation of the recorder system. This subject matter is disclosed and claimed in copending patent application S.N. 705,320, filed concurrently with the instant application in the name of Stanley D. Norem now Patent No. 2,904,384. The latter invention pertains to means for checking the proper selection of component signals, adjustment of the gate means used in bar graph recording, and the operation of the automatic abscissa advance means.

The concept of the present invention is not limited to use in conjunction with vapor fractometer type of equipment, although it has been found to be highly desirable when so used. It will also be apparent to those skilled in the art that the calibration feature of the present invention may be advantageously employed with other than the bar graph mode of recording. For instance, the conventional fractogram of FIG. 1 may be calibrated to enhance the accuracy and facility with which it may be interpreted.

A number of different timing means may be used to actuate the recording system of the present invention depending upon the requirements of each system application. The requirements of explosion-proof equipment may demand enclosed mercury switches mechanically actuated to obviate the hazards of open contact switches. On the other hand, process analysis instruments usually require a wide range of adjustment as well as fail-safe actuating means.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

We claim:

1. Means for recording a plurality of cyclically repetitive time displaced signals as a bar graph, including a recorder having ordinate and abscissa drive means, said ordinate drive means being responsive to the amplitude of the recorder input signal, a source of electrical potential, means for adjusting said potential to match the amplitude of any of said time displaced signals, a plurality of adjustable attenuators connected in parallel to receive said time displaced signals, said attenuators being disposed to be separately connectable to said recorder, means for selectively connecting said potential to each of said attenuators for setting the recorder range of each time displaced signal by adjustment of its associated attenuator, means to disconnect said potential from all of said attenuators, switch means for sequentially connecting said attenuators to said recorder input circuit upon the occurrence of each of a cycle of time displaced signals whereby to energize said ordinate drive means in accordance with the amplitude and selected range of each signal, said switch means including a plurality of control means for sequentially advancing said abscissa drive means by a unit increment between the occurrence of said time displaced signals, regardless of the interval between said signals.

2. Recording apparatus as defined in claim 1 and including means for disconnecting said attenuators from said recorder input circuit during the intervals between said time displaced signals.

3. Recording means as defined in claim 1 and including means for automatically advancing said absissa actuating means several unit increments upon completion of each complete cycle of time displaced signals.

4. Recording apparatus as defined in claim 1 and including means for recording a reference signal at the end of each complete cycle of time displaced signals.

5. Recording apparatus as defined in claim 4 wherein said reference signal is of opposite sense with respect to said recorded time displaced signals.

References Cited in the file of this patent

UNITED STATES PATENTS

| | | |
|---|---|---|
| 2,398,988 | Ziebolz | Apr. 23, 1946 |
| 2,577,735 | Broomell | Dec. 11, 1951 |
| 2,826,908 | Skarstrom | Mar. 18, 1958 |

FOREIGN PATENTS

| | | |
|---|---|---|
| 571,003 | Great Britain | Aug. 1, 1945 |
| 696,009 | Great Britain | Aug. 19, 1953 |

OTHER REFERENCES

Germany, Ser. No. L 17,326, 1X/43a, printed March 29, 1956 (Kl. 43a Gr. 41/03).